US007114077B2

(12) United States Patent
Miller et al.

(10) Patent No.: US 7,114,077 B2
(45) Date of Patent: Sep. 26, 2006

(54) VERIFICATION SYSTEM FOR CONFIDENTIAL DATA INPUT

(76) Inventors: Ryan Miller, 245 Commonwealth Ave., Apt. 4, Boston, MA (US) 02116; Bruce Johnston, 76 Brattle St., Arlington, MA (US) 02474; Ajay Sudan, 32 Hereford St., Boston, MA (US) 02115

( * ) Notice: Subject to any disclaimer, the term of this patent is extended or adjusted under 35 U.S.C. 154(b) by 805 days.

(21) Appl. No.: 09/799,419

(22) Filed: Mar. 5, 2001

(65) Prior Publication Data

US 2002/0122591 A1 Sep. 5, 2002

(51) Int. Cl.
*H04L 9/00* (2006.01)
(52) U.S. Cl. .................................. 713/183; 713/182
(58) Field of Classification Search ............... 713/161, 713/182–186; 382/181; 703/202; 345/341; 726/18; 705/18
See application file for complete search history.

(56) References Cited

U.S. PATENT DOCUMENTS

| | | | | |
|---|---|---|---|---|
| 3,766,520 A | * | 10/1973 | Patterson | 382/198 |
| 5,265,163 A | * | 11/1993 | Golding et al. | 726/19 |
| 5,347,579 A | * | 9/1994 | Blandford | 713/176 |
| 5,689,699 A | * | 11/1997 | Howell et al. | 707/9 |
| 5,731,810 A | * | 3/1998 | Oda | 345/551 |
| 5,928,364 A | * | 7/1999 | Yamamoto | 726/18 |
| 5,991,396 A | * | 11/1999 | Salm et al. | 379/355.09 |
| 6,034,685 A | * | 3/2000 | Kuriyama et al. | 715/784 |
| 6,067,625 A | * | 5/2000 | Ryu | 713/202 |
| 6,091,835 A | * | 7/2000 | Smithies et al. | 382/115 |
| 6,282,510 B1 | * | 8/2001 | Bennett et al. | 704/235 |
| 6,477,491 B1 | * | 11/2002 | Chandler et al. | 704/235 |
| 6,532,446 B1 | * | 3/2003 | King | 704/270.1 |
| 6,618,504 B1 | * | 9/2003 | Yoshino | 382/187 |
| 6,643,784 B1 | * | 11/2003 | McCulligh | 726/18 |
| 6,747,676 B1 | * | 6/2004 | Botz et al. | 715/741 |
| 6,950,949 B1 | * | 9/2005 | Gilchrist | 726/19 |

\* cited by examiner

*Primary Examiner*—Ayaz Sheikh
*Assistant Examiner*—Pramila Parthasarathy
(74) *Attorney, Agent, or Firm*—Akerman Senterfitt; Michael C. Cesarano

(57) ABSTRACT

In an electronic device having a processor, a visual display, apparatus for entering data into said device, and an electronic memory, a method for reliably determining whether confidential handwritten or voice data entered into the electronic device for processing has been recognized by the device as representing a character the user intended to enter, comprising the steps of receiving a data entry, translating the entry into digital signals and combining the digital signals to create a character, saving the character in electronic memory, commencing a timing sequence, displaying the character on the visual display, awaiting the expiration of the timing sequence, and replacing the character with a mask character on the visual display and, if the character was incorrect, allowing the user to re-enter the character and, if the character was correct, accepting another character, and, when all characters have been entered, sending the saved characters to the processor for processing.

25 Claims, 8 Drawing Sheets

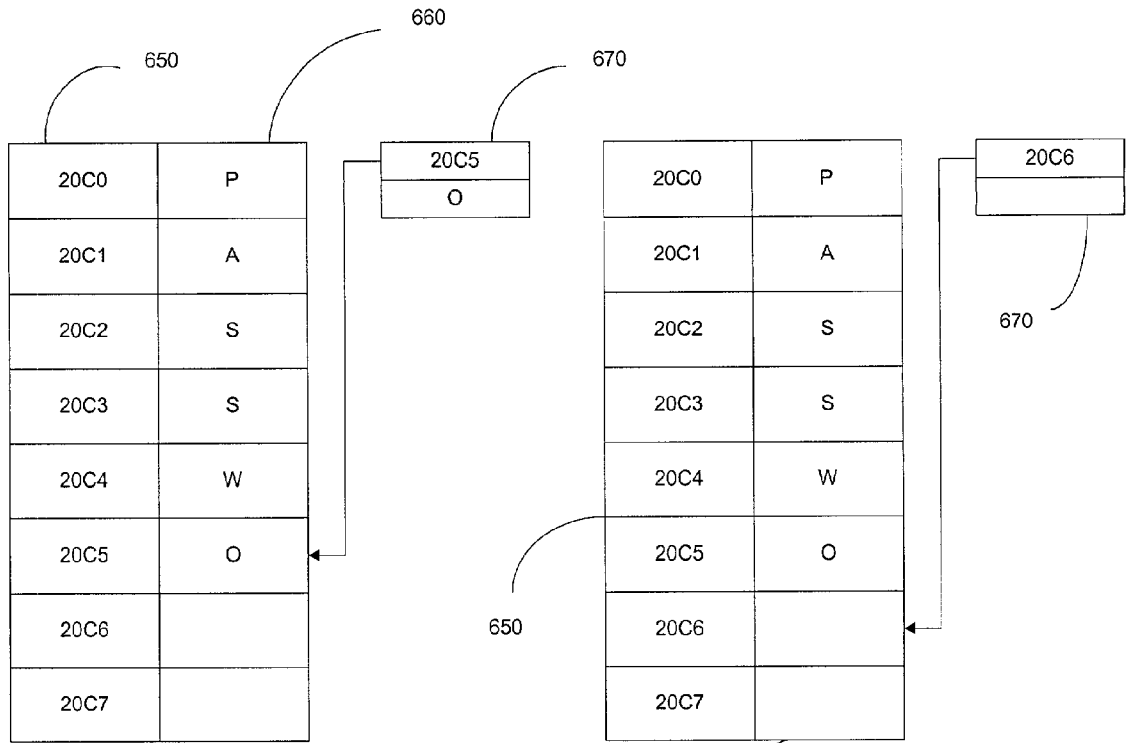
Fig. 6a  Fig. 6b  Fig. 6c

VERIFICATION SYSTEM FOR CONFIDENTIAL DATA INPUT

FIELD OF THE INVENTION

This invention relates to a confidential data entry system for use in environments in which the data recognized by the system may be different from that which was intended to be entered. Upon the temporary visual display of information representing the data recognized by the system, the user can determine whether the intended data was properly entered and, if incorrect, new data may be entered in place of the original entry. This invention is maintained on a device in software storage or firmware and has numerous applications, including but not limited to the entry of confidential information into processing systems in which data is entered through standard keyboard and keypad interfaces, and in systems in which the user interface is imprecise, such as, for example, where input is made through handwriting, voice input, or some other medium in which data entry is susceptible of misrecognition by the system.

BACKGROUND OF THE INVENTION

As used herein, the term "character" refers to a sequence of binary digits representing information that can be recognized by a processing system. As such, a "character" may represent a visual symbol capable of being displayed; a system command to be executed by the system; a digital signal that is generated through the pressing of a button, switch, knob, touchpad, or other user initiated signaling device; a digital signal generated by the system; or any other digital sequence carrying information into, out of, or within the system. "Data" shall refer to the confidential input entered by the user, and may constitute, for example, conventional input from a keyboard or keypad, handwriting applied to a digitizer pad, vocal entries received by a microphone, whistling or other mouth-and-breath combinations, touchpads, touch screens, and other means for entering data into processing systems. The term "word" refers to the confidential information saved in a memory buffer for processing after data entry has been completed.

Methods of entering data into processing systems through a user interface include both precise and imprecise entry methods. Data entered is converted from its raw form into a character that may then be processed in accordance with standard processing methods. Because the data may be seen by the conversion means as constituting something other than what the user intended, there is a possibility that the wrong character will be interpreted by the system.

When confidential data is to be entered into a processing system, the information being entered should not be retained on a display where it can be viewed by persons unauthorized to receive the data. Conventional means for entering confidential data do not echo the data to the display. However, where confidential information is to be entered, but not viewed, there is a possibility that incorrect data will be received.

It is an object of the present invention to provide a data-entry system that will accept a confidential data entry, convert the data to a character, save and temporarily display the character to a user so that the accuracy of the entered confidential data may be verified, and then replace the displayed character with a mask character. This and other objects of the invention will be described in the following descriptions.

BRIEF DESCRIPTION OF THE DRAWINGS

FIGS. 6*a*, 6*b*, and 6*c* depict buffer addresses in memory in which a word will be saved and referenced by a character position indicator.

FIG. 8 depicts a visual display in which a confidential word is being entered.

FIG. 8*a* shows the fourth character of the confidential word being temporarily displayed, while

DETAILED DESCRIPTIONS OF THE PREFERRED EMBODIMENTS

Figure 1:
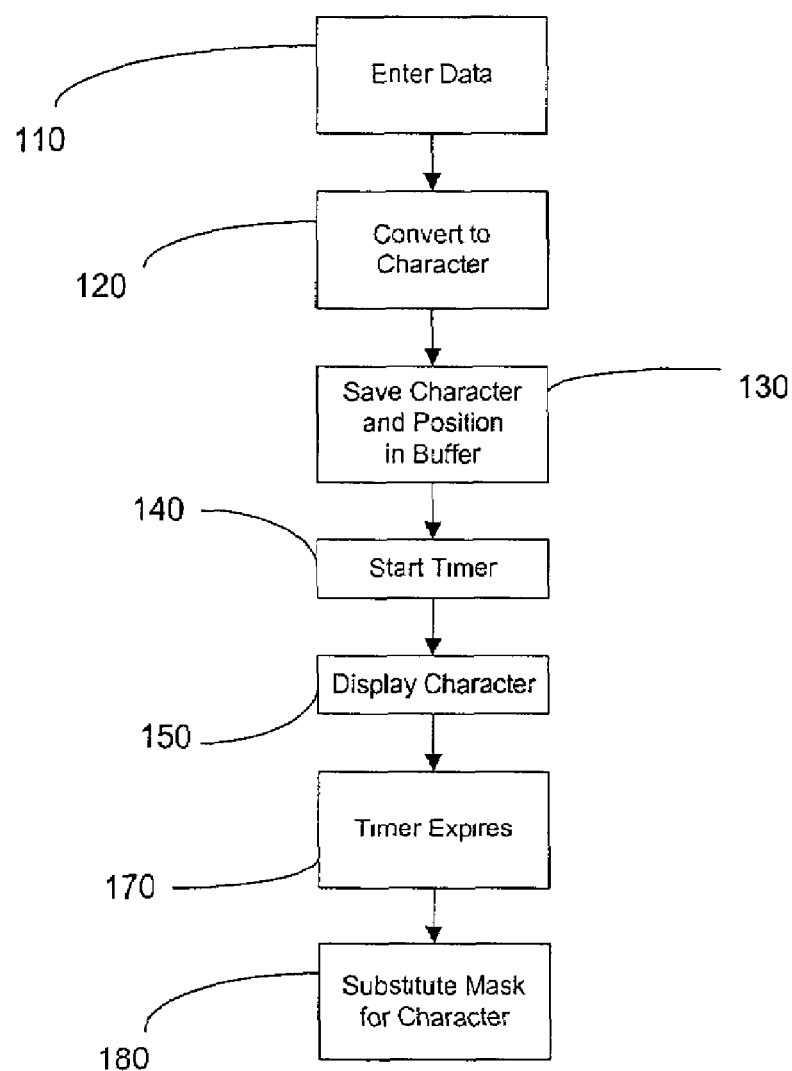
FIG. 1 depicts the process for providing temporary display of a character that has been converted from data, followed by the display of a mask.

In the embodiment shown in FIG. 1, a method for providing temporary, configurable visual authentication for confidential data entered into a processing system is depicted. A user enters data 110. The data can be entered in any one of a number of formats, including but not limited to entry by conventional keyboard or keypad, entry by handwriting upon a digitizer pad, entry through vocal expression that is received by the processing system, entry through mouth and breath activity, as may be available to persons who have lost the use of their hands and arms, entry by touching a touch pad or screen whose borders between adjacent symbols are hidden or otherwise uncertain, entry through a keyboard or keypad whose keys are so small or so close together that users may have difficulty pressing only the correct keys, and other means for data entry where the user interface to the processing system may allow erroneous entry. The system converts the data to a character 120 and saves the character in a memory buffer along with information representing the character's position within the word that will be processed 130. Once a character has been saved along with information indicating its position in the word, a timer 140 is started and the character is echoed to the display where it will be temporarily visible to the user 150. Timer 140 is user configurable and establishes the length of time that the character will be displayed. Upon expiration of the display time 170, the character is replaced in the display by a mask 180. The mask may be any visual symbol selected by the user; may be a default symbol such as an asterisk, a space, or a dash; or may be a meaningless symbol selected at random. After displaying the mask, the system waits for additional input.

Figure 2:
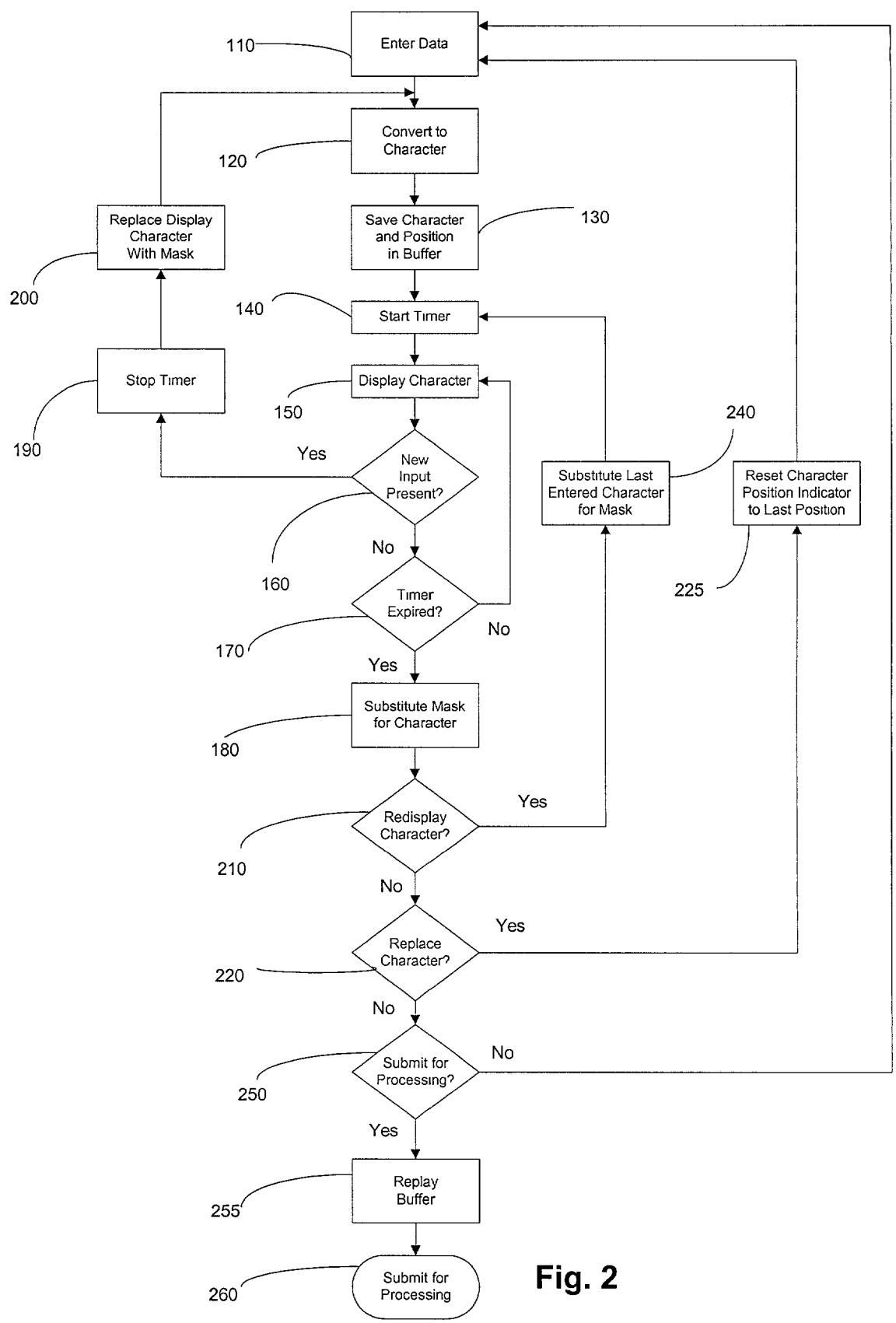
FIG. 2 shows an embodiment for providing temporary display of a character, including the redisplay or re-entry of a character and a process for accepting new input before an earlier entered character has been replaced with a mask.

In FIG. 2, an embodiment is depicted in which a last-displayed character may be redisplayed or replaced with a new character. These functions invoke system commands to perform the routines available to a user to view entered data, verify its accuracy, and submit it for processing.

Once a character has been saved, displayed, and replaced in the display with a mask, a user may ask to have the last character redisplayed 210 or may choose to replace it with a new data entry 220. If the last-displayed character is to be redisplayed, the last-entered character will be recalled to the display 240 and timer 140 will be restarted. If the last-entered character is incorrect and the user wishes to replace it, the position in the word of the incorrect character is referenced 225, and a character converted from new data input is substituted into the position occupied by the incorrect character. If the word is to be processed, it will be replayed from the buffer 255 and submitted for processing 260.

FIG. 2 also depicts an embodiment in which the system may accept a new data entry before the previously entered character has been replaced by a mask. When new data is entered 160, the timer is stopped 190 and the character being displayed is immediately replaced with a mask 200. The system converts the new data to a character 120, and the save-and-display process recommences at 130.

Figure 3:
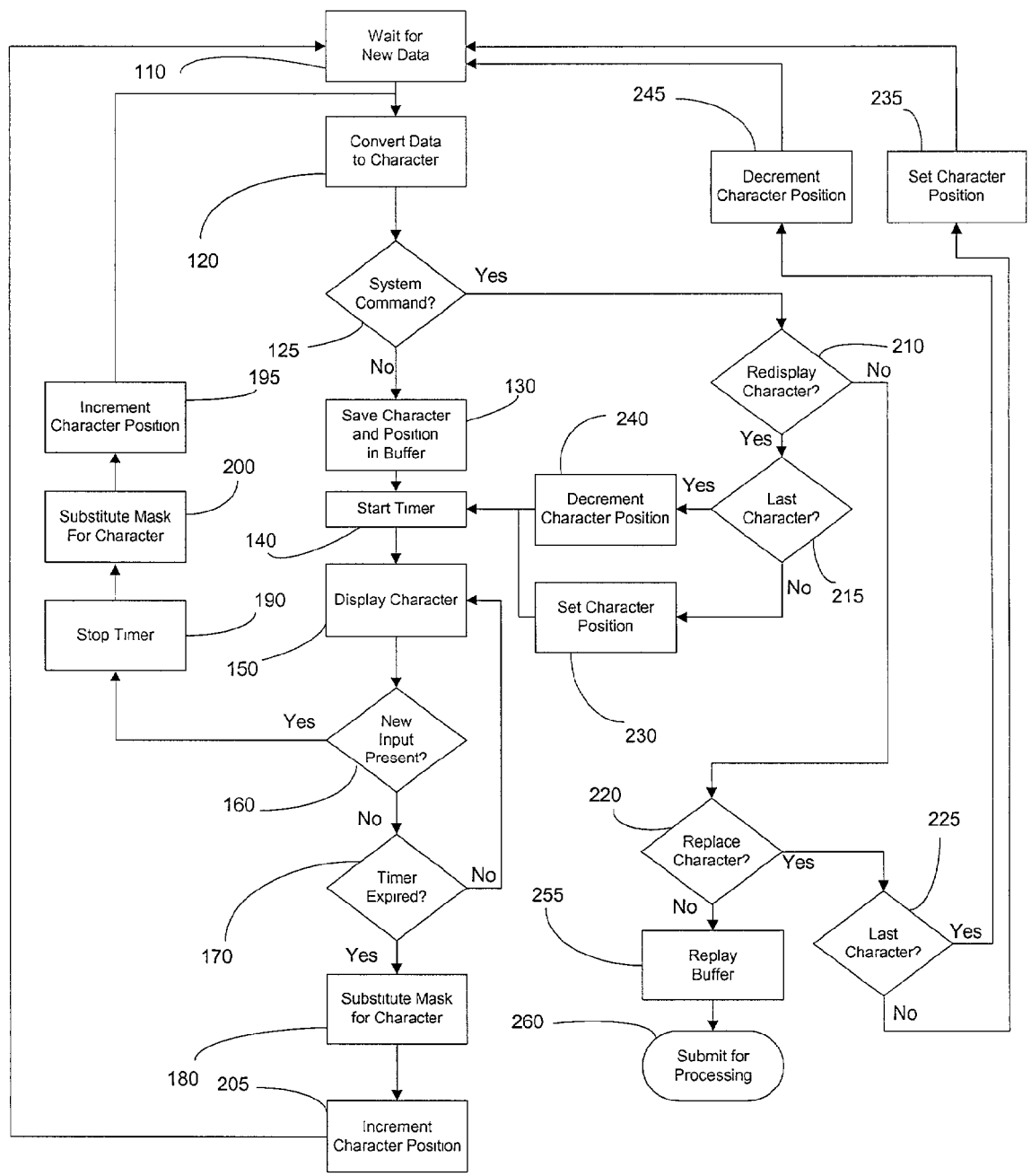
FIG. 3 shows an embodiment of the invention in which system commands may be entered through the primary interface as control characters.

FIG. 3 shows an embodiment in which system commands may be entered through the user interface as new data. In this embodiment, a character position indicator is used to reference the position of each character to be saved to or recalled from the buffer. The character position indicator may be a register, an address at a memory location, a variable used by the system, or any other system facility capable of indicating a position in the word and referencing a location in the buffer where the character occupying that position is saved. There is a correspondence between the position of each character in the buffer and the position of each character making up the word, such that when the character position indicator is incremented, the buffer location for the next character position in the word is referenced, and when the character position indicator is decremented, the buffer location for the previous character position in the word is referenced. In FIG. 3, a data entry 110 is converted to a character 120, and the character is determined to be either a system command or a visually displayable character 125. If the character is recognized as a system command, the command is analyzed to determine which of a number of possible commands is to be acted upon. For example, among other possibilities, FIG. 3 depicts choices in which a character may be redisplayed 210, re-entered 220, or replayed from the buffer 255 and submitted for processing 260. If a character is to be redisplayed, a choice is presented 215 whether the character to be redisplayed is the last-displayed character, or is the character at some other position in the word 230. If the character to be redisplayed is the last entered character, the character position indicator will be decremented 240 and the processing will continue with the starting of the timer 140. If some other previously saved character is to be redisplayed, the character position indicator will be set to the proper character position 230 and the processing will again continue with the starting of the timer 140. As an alternative to the single step of setting the character position 230, some embodiments may opt to perform this function simply by repeatedly decrementing the character position indicator 240 until the character to be redisplayed is reached. In either case, timer 140 will be started, and the character located in the buffer at the address given by the character position indicator will be displayed 150. It will be understood by those practicing in the art that the steps 230 and 240 may be combined as a single step in which the system will default to redisplay the last entered character unless some other character position is specified.

If a previously entered character is to be replaced 220, the decision will be made whether the character to be replaced is the last displayed character or is a character at some other position in the word 225. Depending upon the choice, the position indicator will either be decremented by one position 245 or will be set to the buffer location of the character to be replaced 235. An alternative procedure for setting the character position indicator is simply to repeatedly decrement the character position indicator 245 until the proper character is selected. In addition, the steps of decrementing character position 245 and setting character position 235 may be combined as one, and character re-entry may be set to default to replacement of the last displayed character unless some other character position is indicated. Once character position has been established, newly entered data will be converted to a new character and saved in the buffer 130 in the location previously occupied by the character to be replaced.

FIG. 3 also includes the embodiment in which the system will accept new data that is entered before the timer has expired, while the last entered character is still being displayed. If new data is entered 160, the timer will stop 190, a mask character will be substituted for the character being displayed 200, and the character position indicator 195 will be incremented to indicate the proper position for saving the next character to be saved. FIG. 3 also incorporates a step to increment the character position indicator 205 following the substitution of a mask in the display 180 and prior to the entry of the next new data 110.

Although, as depicted in FIG. 3, control characters may be entered which cause the system to execute system commands, various other embodiments of the invention provide distinct methods for a user to initiate system commands. For example, system commands could be entered through alternative means that do not involve the entry of raw data through the primary user interface. In such an embodiment, the system could include buttons, knobs, or switches having discrete, specialized functions, or programmable functions, to perform system commands. Upon activation of the button, knob, or switch, the system command associated with that activation would be initiated. Such functions are comparable to the specialized keys found on conventional computer keyboards relating to, for example, control functions such as cursor movement, backspace, and "Enter."

Figure 4:
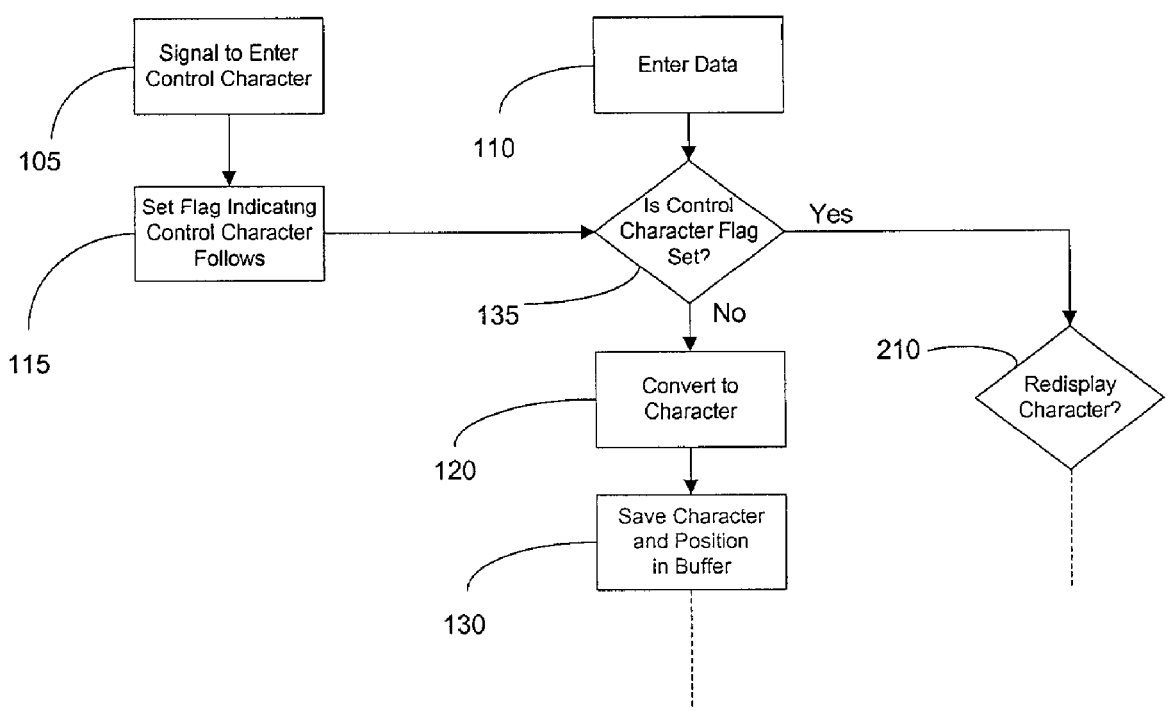
FIG. 4 shows an alternative embodiment for the invention as depicted in FIG. 3 except that control characters may be preceded by a control signal.

FIG. 4 depicts an alternative data entry embodiment to FIG. 3 in which the user signifies that a control character will be entered by first preceding it with a control signal. The control character is then entered as data through the primary user interface, and is interpreted as a system command. The control signal is activated to signal the system that a control character will follow 105. This action could be any action sufficient to initiate a signal, including, for example, the pressing of a button or the closing of a switch on the device. Such an action will set a flag in the system 115 that will then be queried when the next raw data entry is processed 135.

Figure 5:
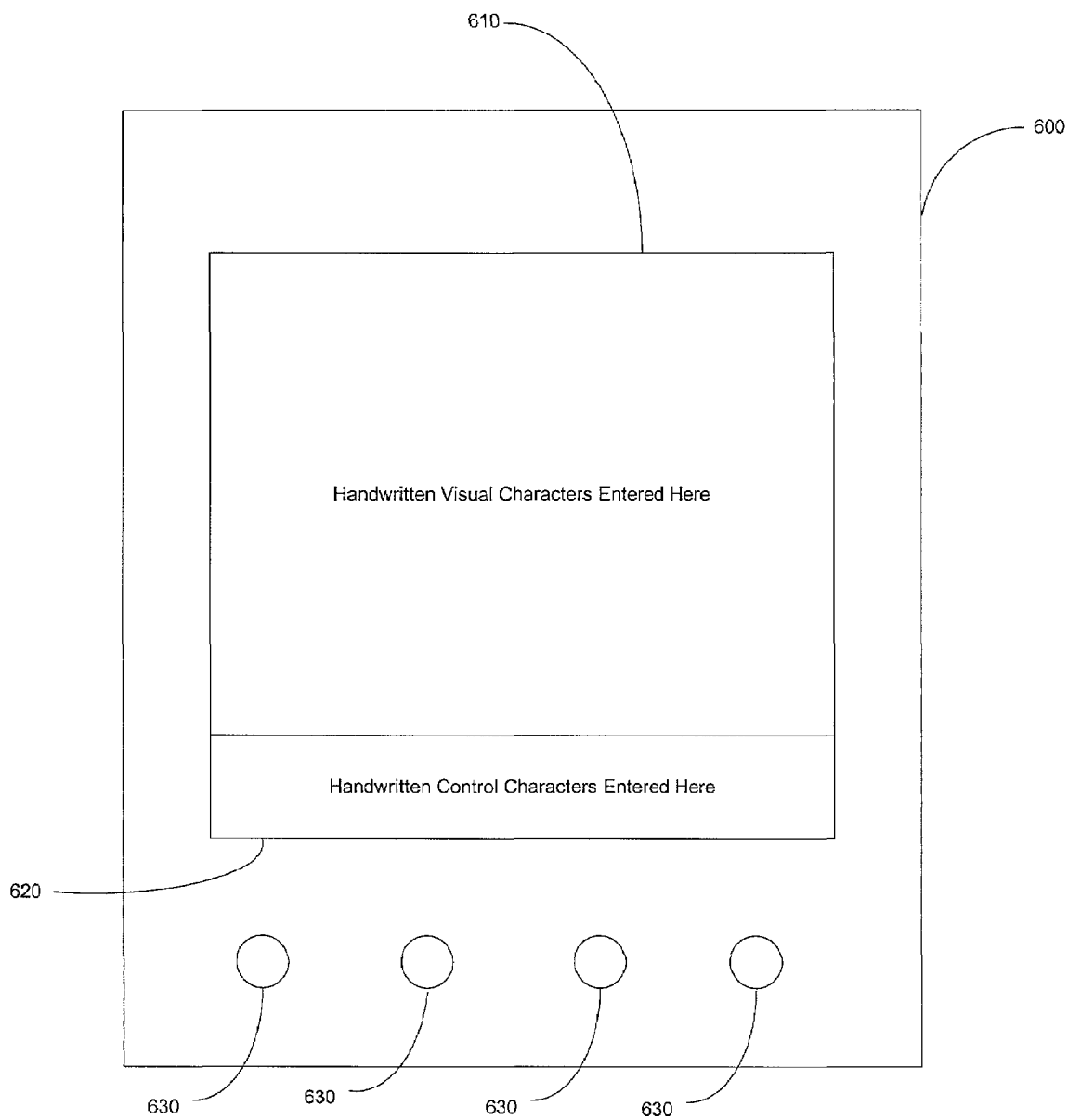
FIG. 5 depicts a device having a digitizer pad in which one area of the pad is set aside for the entry of control characters and in which separate buttons may be used to initiate system commands.

In other embodiments for entering control characters, as depicted, for example, in FIG. 5, raw data may be entered through handwriting on a digitizer pad 600 where the handwriting for displayable characters is made in one area of the pad 610, while handwriting constituting the control characters is entered on a different area of the pad 620. Also depicted in FIG. 5 are buttons 630 that may be preset or programmable to allow a user to initiate system commands with the press of a button. For systems employing vocal data entry, control characters might be preceded by a particular key word, sound, or phrase that is unlikely to be used in the entry of raw data that is to be displayed.

FIGS. 6a, 6b and 6c depict the manner in which the character position locator may be incremented or decremented to point to characters comprising the word being saved in the buffer. Addresses in the buffer 650 correspond to characters stored in the buffer 660. A character position indicator 670 indicates the buffer address and character stored at that address. In FIG. 6a, the character position indicator is referencing the address of the last-saved character. As the character position indicator is incremented, the next position in the word is referenced, as is shown in FIG. 6b. The character position indicator is now in position to save the next character to be saved. If the user should choose to display the last saved character, the character position indicator 670 will be decremented to point to the last saved character, as in FIG. 6a, and that referenced character will be displayed. If the user chooses to decrement the character position indicator to view the next-earliest saved character, then the character position indicator would be as depicted in FIG. 6c.

Figure 7:
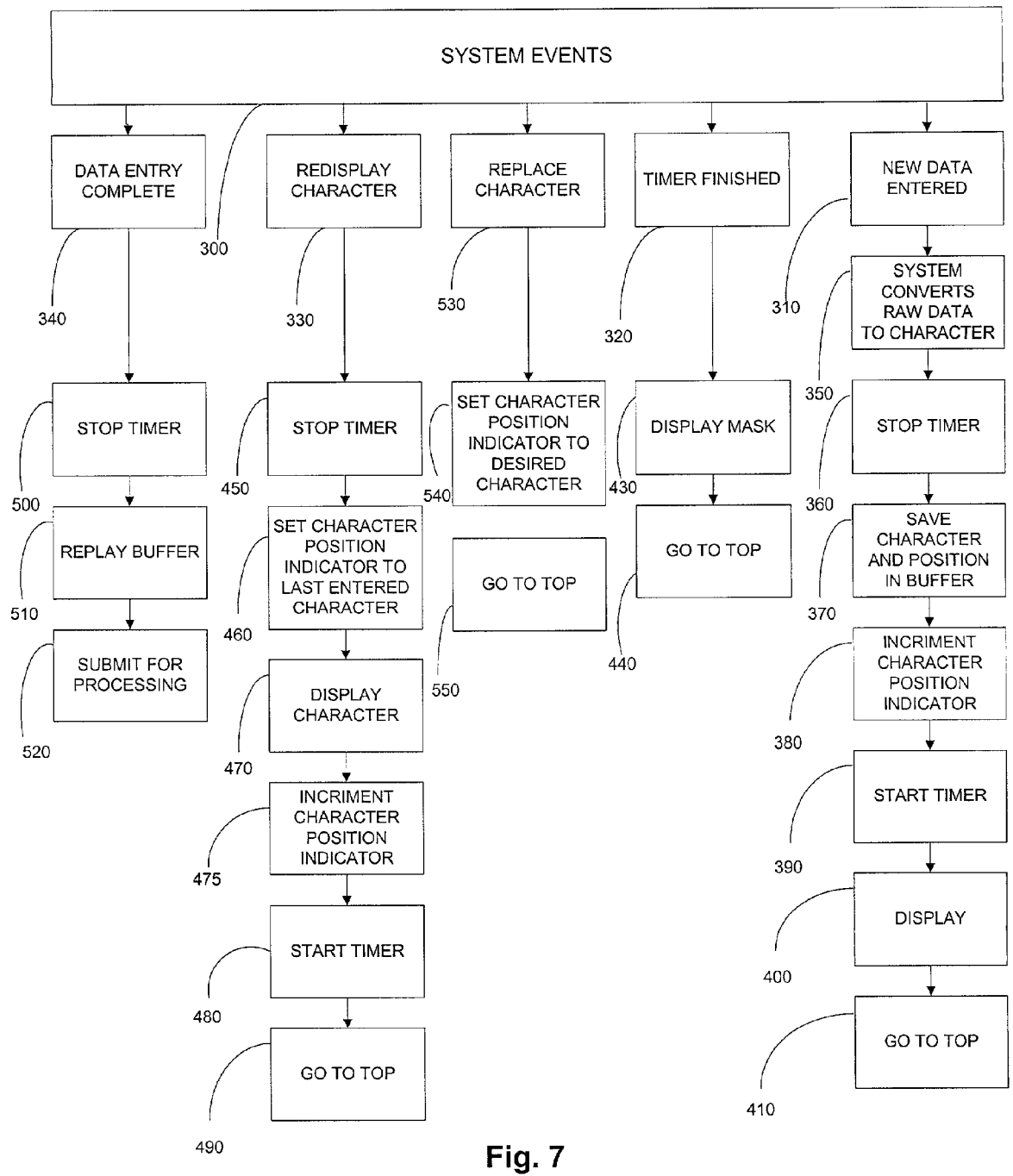
FIG. 7 illustrates an alternative embodiment of the invention in which the steps comprising system events are shown.

An alternative representation of an embodiment of this invention is depicted in FIG. 7, in which the process is shown as a series of system events, each of which is initiated by user action or by automatic system processes. As an event occurs 300, the system will determine whether it relates to the entry of data 310, stopping the timer 320, replacing a character 530, redisplaying the last entered character 330, or signifying the end of word entry 340. Where new raw data is entered, processes maintained elsewhere in the system will convert the raw data to a character 350. If the timer is running, it is stopped 360. The character and its position in the word are saved 370 and the character position indicator is incremented 380. The timer is started 390, the character is displayed 400, and the event terminates 410.

The timer finished event 320 is started by other processes, such as when data is originally entered 280 or when a character is to be redisplayed 470, and the timer event 320 will govern the processes dependent upon the timer. Upon expiration of the timer, the displayed character is replaced by a mask 430, and the event terminates 440. At that point any of the other events may be initiated: new data may be entered 310; a character may be replaced 530; a character may be redisplayed 330; or the user may signify the end of entry of the confidential data 340.

A character may be replaced 530 simply by setting the character position indicator to the character that is to be replaced 540 and terminating the process 550. Upon the entry of new data 310, the new data will replace the character being pointed to by the character position indicator.

Upon a redisplay event 330, the timer will be stopped 450 and the character position indicator will be set to the last entered character 460. The mask will be replaced in the display by the last entered character 470, the character position indicator will be incremented 475, timer 480 will be started, and the event will terminate 490.

When raw data entry has been completed 340, timer 500 will stop and characters saved in the buffer will be replayed in the sequence of their positions in the word 510 and will be submitted for processing 520.

Figure 8A:
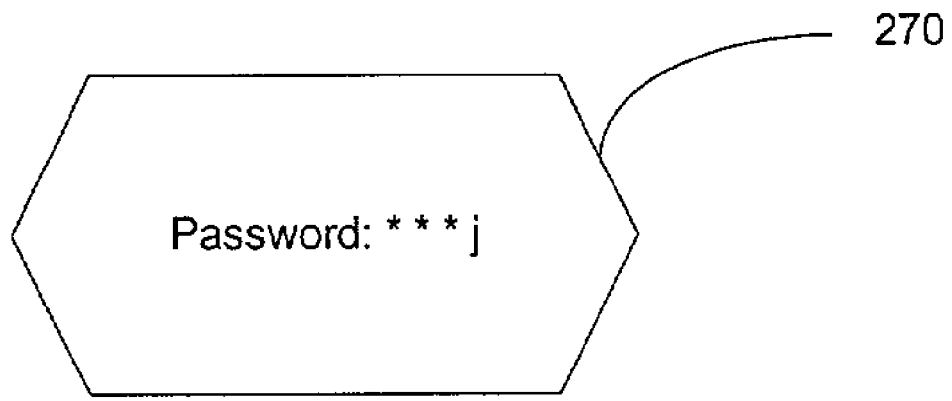
Figure 8B:
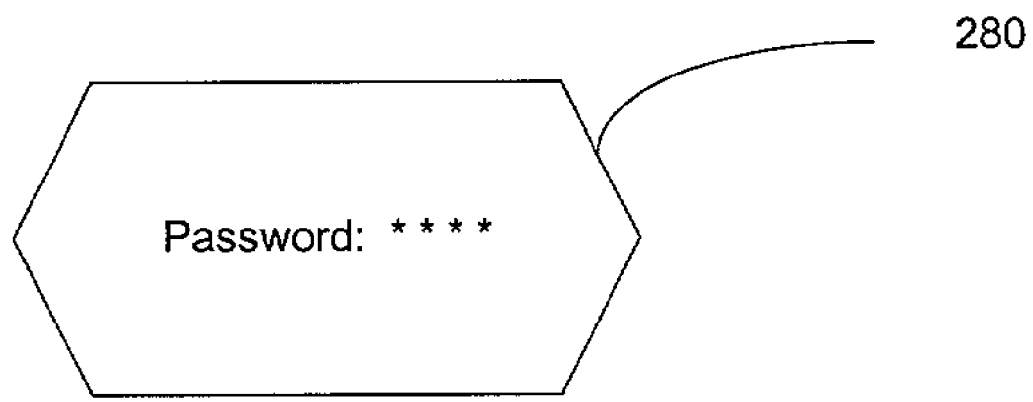
FIG. 8*b* shows the display a few moments later, when the mask has replaced the character.

An example of a visual display in accordance with the system of this invention is given in FIGS. 8a and 8b. In FIG. 8a, four characters of a confidential word have been entered 270, the last of which is shown "in the clear" in temporary display mode. In FIG. 8b, a predetermined length of time later, the last character has been masked 280. The user may determine the length of time a converted character will be displayed.

Although a specific embodiment of the invention has been disclosed, it will be understood by those having skill in the art that changes can be made to this embodiment without departing from the spirit and scope of the invention. The scope of the invention is not to be restricted therefore to the specific embodiment.

What is claimed is:

1. In an electronic device having a processor, a visual display, apparatus for entering data into said device, and an electronic memory including a buffer, a method for reliably determining whether confidential data entered into said electronic device for processing has been recognized by said device as representing a character the user intended to enter, said method comprising the steps of:
   (a) awaiting and receiving a data entry entered through said data entry apparatus, translating said data entry into digital signals and combining said digital signals to create a character;
   (b) determining whether said character is a non-displayable character that represents a system command; and
   (c) if said character is a displayable character,
      saving said displayable character in said buffer as a saved character,
      commencing a timing sequence,
      displaying said displayable character on said visual display,
      awaiting the expiration of said timing sequence,
      replacing said displayable character with a mask character on said visual display and,
      returning to step (a); and
   (d) if said character is a non-displayable character, determining whether said non-displayable character represents a system command to process displayable characters saved in said buffer, and if said non-displayable character represents a system command to process displayable characters saved in said buffer, retrieving said saved characters from said buffer and sending said saved characters to said processor for processing in accordance with processing instructions.

2. The method of claim 1 in which said non-displayable character represents a system command to replace a last saved character with the next entered displayable character, comprising the further steps of
   (e) awaiting a next data entry, translating said next data entry into digital signals and combining said digital signals to create a character,
   (f) determining whether said character is a displayable character, and if said character is a displayable character,
   (g) saving said displayable character in said buffer at the location in which said last saved character was saved,
   (h) commencing a timing sequence,
   (i) displaying said displayable character on said visual display,
   (I) awaiting the expiration of said timing sequence, and
   (k) returning to step (a).

3. The method of claim 1 in which said non-displayable character is one of a plurality of non-displayable characters, and one of said non-displayable characters represents a system command to retrieve and display a last displayed character, comprising the further steps of
   (e) retrieving said last saved character from said buffer,
   (f) displaying said last saved character,
   (g) commencing a timing sequence, (h) awaiting the expiration of said timing sequence, and
(i) returning to step (a).

4. The method of claim 3 in which one of said non-displayable characters represents a system command to replace a last saved character with the next entered displayable character, comprising the further steps of
(e) awaiting a next data entry,
(f) translating said next data entry into digital signals and combining said digital signals to create a character;
(g) determining whether said character is a displayable character, and if said character is a displayable character, saving said displayable character in said buffer at the location in which said last saved character was saved,
(h) commencing a timing sequence,
(i) displaying said displayable character on said visual display,
(j) awaiting the expiration of said timing sequence, and
(k) returning to step (a).

5. In an electronic device having a processor, a visual display, apparatus for entering data into said device, and an electronic memory including a buffer, a method for reliably determining whether confidential data entered into said electronic device for processing has been recoanized by said device as representing a character the user intended to enter, said method comprising the steps of:
(a) awaiting and receiving a data entry entered through said data entry apparatus, translating said data entry into digital signals and combining said digital signals to create a character;
(b) determining whether said character is a non-displayable character that represents a system command; and
(c) if said character is a displayable character,
saving said displayable character in said buffer as a saved character along with information indicating the location in said buffer in which said saved character is saved;
commencing a timing sequence,
displaying said displayable character on said visual display,
awaiting the expiration of said timing sequence,
replacing said displayable character with a mask character on said visual display and,
returning to step (a); and
(d) if said character is a non-displayable character, determining whether said non-displayable character represents a system command to process displayable characters saved in said buffer, and if said non-displayable character represents a system command to process displayable characters saved in said buffer, retrieving said saved characters from said buffer and sending said saved characters to said processor for processing in accordance with processing instructions;
and if one of said plurality of non-displayable characters represents a system command to redisplay an indicated saved character,
(e) retrieving said indicated saved character from its location in said buffer,
(f) displaying said indicated saved character,
(g) commencing a timing sequence,
(h) awaiting the expiration of said timing sequence, and
(i) returning to step (a).

6. The method of claim 5 in which one of said non-displayable characters represents a system command to replace an indicated saved character with the next entered displayable character, comprising the further steps of
(j) awaiting a next data entry,
(k) translating said next data entry into digital signals and combining said digital signals to create a character;
(l) determining whether said character is a displayable character, and if said character is a displayable character, saving said displayable character in said buffer at the location in which said indicated saved character was saved,
(m) commencing a timing sequence,
(n) displaying said displayable character on said visual display,
(o) awaiting the expiration of said timing sequence, and
(p) returning to step (a).

7. A machine readable storage having stored thereon a processor program for reliably determining whether confidential data entered into a machine has been recognized by said machine as representing the character a user intended to enter, said program having a plurality of code sections executable by said machine for causing said machine to perform the steps of:
(a) awaiting and receiving a data entry entered through a data entry apparatus, translating said data entry into digital signals, and combining said digital signals to create a character;
(b) determining whether said character is a non-displayable character that represents a system command; and if said character is a displayable character,
saving said displayable character in a buffer as a saved character,
(c) commencing a timing sequence,
(d) displaying said displayable character on a visual display,
(e) awaiting the occurrence of an event and,
(f) upon the occurrence of said event, replacing said displayable character with a mask character on said visual display, and if said event constitutes a next data entry, translating said next data entry into digital signals, combining said digital signals to create a character, and returning to step (b); and if said event signifies the expiration of said timing sequence, returning to step (a); and
(g) if said character is a non-displayable character that represents a system command to process saved characters in said buffer, retrieving said saved characters from said buffer and sending said saved characters to said processor for processing in accordance with processing instructions.

8. The method of claim 7 in which said non-displayable character is one of a plurality of non-displayable characters, and one of said non-displayable characters represents a system command to retrieve and display a last saved character, comprising the further steps of
(h) retrieving said last saved character from said buffer,
(i) displaying said last saved character,
(j) commencing a timing sequence,
(k) awaiting an event, and
(l) returning to step (f).

9. The method of claim 7 in which one of said non-displayable characters represents a system command to replace a last saved character with the next entered displayable character, comprising the further steps of
(h) awaiting a next data entry,
(i) translating said next data entry into digital signals and combining said digital signals to create a character;
(j) determining whether said character is a displayable character, and if said character is a displayable character, saving said displayable character in said buffer at the location in which said last saved character was saved,
(k) commencing a timing sequence,
(1) displaying said displayable character on said visual display,
(in) awaiting an event, and
(n) returning to step (f).

10. A machine readable storage having stored thereon a processor program for reliably determining whether confidential data entered into a machine has been recognized by said machine as representing the character a user intended to enter, said program having a plurality of code sections executable by said machine for causing said machine to perform the steps of:
(a) awaiting and receiving a data entry entered through a data entry apparatus, translating said data entry into digital signals, and combining said digital signals to create a character;
(b) determining whether said character is a non-displayable character that represents a system command; and if said character is a displayable character, saving said displayable character in a buffer as a saved character,
(c) commencing a timing sequence,
(d) displaying said displayable character on a visual display,
(e) awaiting the occurrence of an event and,
(f) upon the occurrence of said event, replacing said displayable character with a mask character on said visual display, and if said event constitutes a next data entry, translating said next data entry into digital signals, combining said digital signals to create a character, and returning to step (b); and if said event signifies the expiration of said timing sequence, returning to step (a); and
(g) if said character is a non-displayable character that represents a system command to process saved characters in said buffer, retrieving said saved characters from said buffer and sending said saved characters to said processor for processing in accordance with processing instructions;
and if one of said plurality of non-displayable characters represents a system command to redisplay an indicated saved character,
(h) retrieving said indicated saved character from its location in said buffer,
(i) displaying said indicated character,
(j) commencing a timing sequence,
(k) awaiting an event, and
(l) returning to step (f).

11. The method of claim 10 in which one of said non-displayable characters represents a system command to replace an indicated saved character with the next entered displayable character, comprising the further steps of
(l) awaiting a next data entry,
(m) translating said next data entry into digital signals and combining said digital signals to create a character;
(n) determining whether said character is a displayable character, and if said character is a displayable character, saving said displayable character in said buffer at the location in which said indicated saved character was saved,
(o) commencing a timing sequence,
(p) displaying said displayable character on said visual display,
(q) awaiting an event, and
(r) returning to step (f).

12. The method of claim 1 in which said confidential data is a password.

13. The method of claim 1 in which said data entry comprises handwritten information.

14. The method of claim 7 in which said confidential data is a password.

15. The method of claim 7 in which said data entry comprises handwritten information.

16. A method for reliably determining whether confidential data entered into an electronic device for processing has been recognized by the device as representing a character the user intended to enter, said method comprising the steps of:
(a) receiving a data entry representing a displayable character,
(b) translating said data entry into a displayable character,
(c) saving said displayable character in a buffer,
(d) commencing a timing sequence,
(e) displaying said displayable character on a visual display,
(f) awaiting the expiration of said timing sequence,
(g) replacing said displayable character with a mask character on said visual display and,
(h) if all characters representing said confidential data have been entered, receiving a system command to retrieve said characters from said buffer and send said characters to a processor for processing and,
(i) if all characters representing said confidential data have not been entered, returning to step (a).

17. A method for reliably determining whether confidential data entered into an electronic device for processing has been recognized by the device as representing a character the user intended to enter, said method comprising the steps of:
(a) receiving a data entry and determining whether said entry represents a displayable character, and if said entry represents a displayable character,
(b) translating said data entry into a displayable character,
(c) saving said displayable character in a buffer,
(d) commencing a timing sequence,
(e) displaying said displayable character on a visual display,
(f) awaiting the expiration of said timing sequence,
(g) replacing said displayable character with a mask character on said visual display and,
(h) if all characters representing said confidential data have been entered, receiving a system command to retrieve said characters from said buffer and send said characters to a processor for processing; and if said entry represents method a system command to redisplay the last saved character, commencing said timing sequence, displaying said last saved character on said visual display, awaiting the expiration of said timing sequence, and returning to step (a).

18. The method of claim 16 further comprising the steps of receiving a system command to replace the last saved character, receiving a data entry representing a displayable character, translating said data entry into a displayable character, saving said displayable character in said buffer at the address in which said last saved character was saved, commencing a timing sequence, displaying said displayable character on a visual display, awaiting the expiration of said timing sequence, replacing said displayable character with a mask character on said visual display and returning to step (a).

19. A method for reliably determining whether confidential data entered into an electronic device for processing has been recognized by the device as representing a character the user intended to enter, said method comprising the steps of:
(a) receiving a data entry representing a displayable character,
(b) translating said data entry into a displayable character,
(c) saving said displayable character in a buffer,
(d) commencing a timing sequence,
(e) displaying said displayable character on a visual display,
(f) awaiting the expiration of said timing sequence,
(g) replacing said displayable character with a mask character on said visual display and,
(h) if all characters representing said confidential data have been entered, receiving a system command to retrieve said characters from said buffer and send said characters to a processor for processing; and
(i) if said data entry is a system command to redisplay an indicated saved character, retrieving said indicated character from said buffer, commencing said timing sequence, displaying said indicated character on said visual display, awaiting the expiration of said timing sequence, and returning to step (a);and
(j) if all characters representing said confidential data have not been entered, returning to step (a); and if said data entry is.

20. The method of claim 19 further comprising the steps of receiving a system command to replace an indicated saved character with a next data entry representing a displayable character, receiving a next data entry representing a displayable character, translating said next data entry into a displayable character, saving said displayable character in said buffer at the address in which said indicated saved character was saved, commencing a timing sequence, displaying said displayable character on a visual display, awaiting the expiration of said timing sequence, replacing said displayable character with a mask character on said visual display and returning to step (a).

21. A method for reliably determining whether confidential data entered into an electronic device for processing has been recognized by the device as representing a character the user intended to enter, said method comprising the steps of:
(a) receiving a data entry representing a displayable character,
(b) translating said data entry into a displayable character,
(c) saving said displayable character in a buffer as a saved character,
(d) commencing a timing sequence,
(e) displaying said displayable character on a visual display,
(f) awaiting an event and upon the occurrence of said event, replacing said displayable character with a mask character on said visual display and,
  (1) if said event is the expiration of said timing sequence, returning to (a), and
  (2) if said event is a next data entry representing a displayable character, returning to (b); and
  (3) if said event is a system command to retrieve and process said saved characters, retrieving said saved characters from said buffer and sending said saved characters to a processor for processing, and
  (4) if said event is a system command other than a command to retrieve and process said saved characters, executing said system command.

22. A method for reliably determining whether confidential data entered into an electronic device for processing has been recognized by the device as representing a character the user intended to enter, said method comprising the steps of:
(a) receiving a data entry representing a displayable character,
(b) translating said data entry into a displayable character,
(c) saving said displayable character in a buffer as a saved character,
(d) commencing a timing sequence,
(e) displaying said displayable character on a visual display,
(f) awaiting an event and upon the occurrence of said event, replacing said displayable character with a mask character on said visual display and,
  (1) if said event is the expiration of said timing sequence, returning to (a), and
  (2) if said event is a next data entry representing a displayable character, returning to (b); and
  (3) if said event is a system command to retrieve and process said saved characters, retrieving said saved characters from said buffer and sending said saved characters to a processor for processing, and
  (4) if said event is a system command to redisplay a last saved character, retrieving said last saved character from said buffer, commencing said timing sequence, redisplaying said last saved character on said visual display, and returning to (f); and
  (5) if said event is a system command other than a command to retrieve and process said saved characters or a command to redisplay a last saved character, executing said system command.

23. The method of claim 22 in which one of said events is a system command to replace a last saved character with a next entered a displayable character, said event comprising the further steps of receiving a data entry representing a displayable character, translating said data entry into a displayable character, saving said displayable character in said buffer in the location from which said last saved character was retrieved, commencing a timing sequence, displaying said displayable character on a visual display, and returning to (f).

24. A method for reliably determining whether confidential data entered into an electronic device for processing has been recognized by the device as representing a character the user intended to enter, said method comprising the steps of:
(a) receiving a data entry representing a displayable character,
(b) translating said data entry into a displayable character,
(c) saving said displayable character in a buffer as a saved character,
(d) commencing a timing sequence,
(e) displaying said displayable character on a visual display,
(f) awaiting an event and upon the occurrence of said event, replacing said displayable character with a mask character on said visual display and,
  (1) if said event is the expiration of said timing sequence, returning to (a), and
  (2) if said event is a next data entry representing a displayable character, returning to (b); and
  (3) if said event is a system command to retrieve and process said saved characters, retrieving said saved characters from said buffer and sending said saved characters to a processor for processing, and
  (4) if said event is a system command to redisplay an indicated saved character, retrieving an indicated saved character from said buffer, commencing said timing sequence, redisplaying said indicated character on said visual display, and returning to (f); and (5) if said event is a system command other than a command to retrieve and process said saved characters, or to redisplay an indicated saved character, executing said system command.

25. The method of claim 24 in which one of said events is a system command to replace an indicated saved character with a next entered displayable character, said event comprising the further steps of receiving a data entry representing a displayable character, translating said data entry into a displayable character, saving said displayable character in said buffer at the address from which said indicated saved character was retrieved, commencing a timing sequence, displaying said displayable character on a visual display, and returning to (f).

* * * * *